United States Patent [19]

Vishwanath et al.

[11] Patent Number: 5,602,589
[45] Date of Patent: Feb. 11, 1997

[54] VIDEO IMAGE COMPRESSION USING WEIGHTED WAVELET HIERARCHICAL VECTOR QUANTIZATION

[75] Inventors: Mohan Vishwanath, Mountain View; Philip Chou, Menlo Park, both of Calif.

[73] Assignee: Xerox Corporation, Stamford, Conn.

[21] Appl. No.: 293,612

[22] Filed: Aug. 19, 1994

[51] Int. Cl.$^6$ ............................... H04N 7/28; H04N 7/30
[52] U.S. Cl. ........................ 348/398; 348/422; 382/240; 382/248
[58] Field of Search ..................... 348/398, 422, 348/384, 414, 417, 418; 382/232, 240, 248; H04N 7/28, 7/30

[56] References Cited

U.S. PATENT DOCUMENTS

| | | | |
|---|---|---|---|
| 5,272,529 | 12/1993 | Frederiksen | 348/398 |
| 5,321,776 | 6/1994 | Shapiro | 348/384 |
| 5,398,069 | 3/1995 | Huang | 348/422 |
| 5,412,741 | 5/1995 | Shapiro | 348/398 |
| 5,477,272 | 12/1995 | Zhang | 348/407 |

OTHER PUBLICATIONS

M. Garrett and M. Vetterli, "Joint Source/Channel Coding of Statistically Multiplexed Real–Time Services on Packet Networks", *IEEE/ACM Transactions on Networking*, vol. 1, No. 1 at 71, Feb. 1993.

J. Shapiro, "Embedded Image Coding Using Zerotrees of Wavelet Coefficients", *IEEE Transactions on Signal Processing*, vol. 41, No. 12 at 3445, Dec. 1993.

P. Chang, *Predictive, Hierarchical, and Transform Vector Quantization for Speech Coding*, iv, 39–47 (May 1986).

M. Vishwanath, R. Owens, M. Irwin, "VLSI Architectures for the Discrete Wavelet Transform", Proceedings of Application Specific Array Processors (ASAP) 1992 and I.E.E.E. VLSI Signal Proc. Wkshp. (1992).

M. Vishwanath, C. Chakrabarti, "A VLSI Architecture for Real–Time Hierarchical Encoding/Decoding of Video Using the Wavelet Transform", International Conference on Acoustic, Speech, and Signal Processing (ICASSP) (1993).

P. Chang, J. May, R. Gray, "Hierarchical Vector Quantizers with Table–Lookup Encoders", *IEEE*, at 45.5.1 (1985).

*Primary Examiner*—Howard W. Britton
*Attorney, Agent, or Firm*—Fay, Sharpe, Beall, Fagan, Minnich & McKee

[57] ABSTRACT

A weighted wavelet hierarchical vector quantization (WWHVQ) procedure is initiated by obtaining an N×N pixel image where 8 bits per pixel (steps 10 and 12). A look-up operation is performed to obtain data representing a discrete wavelet transform (DWT) followed by a quantization of the data (step 14). Upon completion of the look-up, a data compression will have been performed. Further stages and look-up will result in further compression of the data, i.e., 4:1, 8:1, 16:1, 32:1, 64:1, . . . etc. Accordingly, a determination is made whether the compression is complete (step 16). If the compression is incomplete, further look-up is performed. If the compression is complete, however, the compressed data is transmitted (step 18). It is determined at a gateway whether further compression is required (step 19). If so, transcoding is performed (step 20). The receiver receives the compressed data (step 22). Subsequently, a second look-up operation is performed to obtain data representing an inverse discrete wavelet transform of the decompressed data (step 24). After one iteration, the data is decompressed by a factor of two. Further iterations allows for further decompression of the data. Accordingly, a determination is made whether decompression is complete (step 26). If the decompression is in incomplete, further look-ups are performed. If, however, the decompression is complete, the WWHVQ procedure is ended (step 28).

18 Claims, 12 Drawing Sheets

VIDEO IMAGE COMPRESSION USING WEIGHTED WAVELET HIERARCHICAL VECTOR QUANTIZATION

BACKGROUND OF THE INVENTION

This invention relates to a method and apparatus for compressing a video image for transmission to a receiver and/or decompressing the image at the receiver. More particularly, the invention is directed to an apparatus and method for performing data compression on a video image using weighted wavelet hierarchical vector quantization (WWHVQ). WWHVQ advantageously utilizes certain aspects of hierarchical vector quantization (HVQ) and discrete wavelet transform (DWT), a subband transform.

A vector quantizer (VQ) is a quantizer that maps k-dimensional input vectors into one of a finite set of k-dimensional reproduction vectors, or codewords. An analog-to-digital converter, or scalar quantizer, is a special case in which the quantizer maps each real number to one of a finite set of output levels. Since the logarithm (base 2) of the number of codewords is the number of bits needed to specify the codeword, the logarithm of the number of codewords, divided by the vector dimension, is the rate of the quantizer in bits per symbol.

A VQ can be divided into two parts: an encoder and a decoder. The encoder maps the input vector into a binary code representing the index of the selected reproduction vector, and the decoder maps the binary code into the selected reproduction vector.

A major advantage of ordinary VQ over other types of quantizers (e.g., transform coders) is that the decoding can be done by a simple table lookup. A major disadvantage of ordinary VQ with respect to other types of quantizers is that the encoding is computationally very complex. An optimal encoder performs a full search through the entire set of reproduction vectors looking for the reproduction vector that is closest (with respect to a given distortion measure) to each input vector.

For example, if the distortion measure is squared error, then the encoder computes the quantity $\|x-y\|^2$ for each input vector X and reproduction vector y. This results in essentially M multiply/add operations per input symbol, where M is the number of codewords. A number of suboptimal, but computationally simpler, vector quantizer encoders have been studied in the literature. For a survey, see the book by Gersho and Gray, Vector Quantization and Signal Compression, Kluwer, 1992.

Hierarchical vector quantization (HVQ) is VQ that can encode using essentially one table lookup per input symbol. (Decoding is also done by table lookup). To the knowledge of the inventors, HVQ has heretofore not appeared in the literature outside of Chapter 3 of the Ph.D. thesis of P. Chang, *Predictive, Hierarchical, and Transform Vector Quantization for Speech Coding*, Stanford University, May 1986, where it was used for speech. Other methods named "hierarchical vector quantization" have appeared in the literature, but they are unrelated to the HVQ that is considered respecting the present invention.

The basic idea behind HVQ is the following. The input symbols are finely quantized to p bits of precision. For image data, p=8 is typical. In principle it is possible to encode a k-dimensional vector using a single lookup into a table with a kp-bit address, but such a table would have $2^{kp}$ entries, which is clearly infeasible if k and p are even moderately large. HVQ performs the table lookups hierarchically. For example, to encode a k=8 dimensional vector (whose components are each finely quantized to p=8 bits of precision) to 8 bits representing one of M=256 possible reproductions, the hierarchical structure shown in FIG. 1a can be used, in which Tables 1, 2, and 3 each have 16-bit inputs and 8-bit outputs (i.e., they are each 64 KByte tables).

A signal flow diagram for such an encoder is shown in FIG. 1b. In the HVQ of FIG. 1b, the tables T at each stage of the encoder along with the delays Z are illustrated. Each level in the hierarchy doubles the vector dimension of the quantizer, and therefore reduces the bit rate by a factor of 2. By similar reasoning, the ith level in the hierarchy performs one lookup per $2^i$ samples, and therefore the total number of lookups per sample is at most $1/2+1/4+1/8+\ldots=1$, regardless of the number of levels. Of course, it is possible to vary these calculations by adjusting the dimensions of the various tables.

The contents of the HVQ tables can be determined in a variety of ways. A straightforward way is the following. With reference to FIG. 1a, Table 1 is simply a table-lookup version of an optimal 2-dimensional VQ. That is, an optimal 2-dimensional full search VQ with M=256 codewords is designed by standard means (e.g., the generalized Lloyd algorithm discussed by Gersho and Gray), and Table 1 is filled so that it assigns to each of its $2^{16}$ possible 2-dimensional input vectors the 8-bit index of the nearest codeword.

Table 2 is just slightly more complicated. First, an optimal 4-dimensional full search VQ with M=256 codewords is designed by standard means. Then Table 2 is filled so that it assigns to each of its $2^{16}$ possible 4-dimensional input vectors (i.e., the cross product of all possible 2-dimensional output vectors from the first stage) the 8-bit index of its nearest codeword. The tables for stages 3 and up are designed similarly. Note that the distortion measure is completely arbitrary.

A discrete wavelet transformation (DWT), or more generally, a tree-structured subband decomposition, is a method for hierarchical signal transformation. Little or no information is lost in such a transformation. Each stage of a DWT involves filtering a signal into a low-pass component and a high-pass component, each of which is critically sampled (i.e., down sampled by a factor of two). A more general tree-structured subband decomposition may filter a signal into more than two bands per stage, and may or may not be critically sampled. Here we consider only the DWT, but those skilled in the art can easily extend the relevant notions to the more general case.

With reference to FIG. 2a, let $X=(x(0), x(1), \ldots, x(N-1))$ be a 1-dimensional input signal with finite length N. As shown by the tree structure A, the first stage of a DWT decomposes the input signal $X_{L0}=X$ into the low-pass and high-pass signals $X_{L1}=(x_{L1}(0), x_{L1}(1), \ldots X_{L1}(N/2-1))$ and $X_{H1}=(X_{H1}(0), x_{H1}(1), \ldots, X_{H1}(N/2-1))$, each of length N/2. The second stage decomposes only the low-pass signal $X_{L1}$ from the first stage into the low-pass and high-pass signals $X_{L2}=(x_{L2}(0), x_{L2}(1), \ldots, x_{L2}(N/4-1))$ and $X_{H2}=(x_{H2}(0), X_{H2}(1), \ldots, x_{H2}(N/4-1))$, each of length N/4. Similarly, the third stage decomposes only the low-pass signal $X_{L2}$ from the second stage into low-pass and high-pass signals $X_{L3}$ and $X_{H3}$ of lengths N/8, and so on. It is also possible for successive stages to decompose some of the high-pass signals in addition to the low-pass signals. The set of signals at the leaves of the resulting complete or partial tree is precisely the transform of the input signal at the root. Thus a DWT can be regarded as a hierarchically nested set of transforms.

To specify the transform precisely, it is necessary to specify the filters used at each stage. We consider only finite impulse response (FIR) filters, i.e., wavelets with finite support. L is the length of the filters (i.e., number of taps), and the low-pass filter (the scaling function) and the high-pass filter (the difference function, or wavelet) are designated by their impulse responses, $l(0), l(1), \ldots, l(L-1)$, and $h(0), h(1), \ldots h(L-1)$, respectively. Then at the output of the mth stage, $$x_{L,m}(i)=l(0)x_{L,m-1}(2i)+l(1)x_{L,m-1}(2i+1)+ \ldots +l(L-1)x_{L,m-1}(2i+L-1)$$

$$x_{H,m}(i)=h(0)x_{L,m-1}(2i)+h(1)x_{L,m-1}(2i+1)+ \ldots +h(L-1)x_{L,m-1}(2i+L-1)$$

for $i=0, 1, \ldots, N/2^m$. Boundary effects are handled in some expedient way, such as setting signals to zero outside their windows of definition. The filters may be the same from node to node, or they may be different.

The inverse transform is performed by different low-pass and high-pass filters, called reconstruction filters, applied in reverse order. Let $l'(0), l'(1), \ldots, l'(L-1)$ and $h'(0), h'(1), \ldots h'(L-1)$ be the impulse responses of the inverse filters. Then $X_{L,m-1}$ can be reconstructed from $X_{L,m}$ and $X_{H,m}$ as:

$$x_{L,m-1}(2i)=l'(0)x_{L,m}(i)+l'(2)x_{L,m}(i+1)+h'(0)x_{H,m}(i)+h'(2)x_{H,m}(i+1)$$

$$x_{L,m-1}(2i+1)=l'(1)x_{L,m}(i+1)+l'(3)x_{L,m}(i+2)+h'(1)x_{H,m}(i+1)+h'(3)x_{H,m}(i+2)$$

for $i=0,1, \ldots, N/2^m$. That is, the low-pass and high-pass bands are up sampled (interpolated) by a factor of two, filtered by their respective reconstruction filters, and added.

Two-dimensional signals are handled similarly, but with two-dimensional filters. Indeed, if the filters are separable, then the filtering can be accomplished by first filtering in one dimension (say horizontally along rows), then filtering in the other dimension (vertically along columns). This results in the hierarchical decompositions illustrated in FIGS. 2B, showing tree structure B, and 2C, in which the odd stages operate on rows, while the even stages operate on columns. If the input signal $X_{L0}$ is an N×N image, then $X_{L1}$ and $X_{H1}$ are N×(N/2) images, $X_{LL2}$, $X_{LH2}$, $X_{HL2}$, and $X_{HH2}$ are (N/2)×(N/2) images, and so forth.

Moreover, notwithstanding that which is known about HVQ and DWT, a wide variety of video image compression methods and apparatuses have been implemented. One existing method that addresses transcoding problems is the algorithm of J. Shapiro, "Embedded Image Coding using Zerotrees of Wavelet Coefficients," IEEE, Transactions on Signal Processing, December 1993, in which transcoding can be done simply by stripping off prefixes of codes in the bit stream. However, this algorithm trades simple transcoding for computationally complex encoding and decoding.

Other known methods lack certain practical and convenient features. For example, these other known video compression methods do not allow a user to access the transmitted image at different quality levels or resolutions during an interactive multicast over multiple rate channels in a simplified system wherein encoding and decoding are accomplished solely by the performance of table lookups.

More particularly, using these other non-embedded encoding video compression algorithms, when a multicast (or simulcast, as applied in the television industry) of a video stream is accomplished over a network, either every receiver of the video stream is restricted to a certain quality (and hence bandwidth) level at the sender or bandwidth (and CPU cycles or compression hardware) is unnecessarily used by multicasting a number of streams at different bit rates.

In video conferencing (multicast) over a heterogeneous network comprising, for example, ATM, the Internet, ISDN and wireless, some form of transcoding is typically accomplished at the "gateway" between sender and receiver when a basic rate mismatch exists between them. One solution to the problem is for the "gateway"/receiver to decompress the video stream and recompress and scale it according to internal capabilities. This solution, however, is not only expensive but also increases latency by a considerable amount. The transcoding is preferably done in an online fashion (with minimal latency/buffering) due to the interactive nature of the application and to reduce hardware/software costs.

From a user's perspective, the problem is as follows: (a) Sender(i) wants to send a video stream at K bits/sec to M receivers. (b) Receiver(j) wants to receive Sender(i)'s video stream at L bits/sec (L<K). (c) But, the image dimensions that Receiver(j) desires or is capable of processing are smaller than the default dimensions that Sender(i) encoded.

It is desirable that any system and/or method to address these problems in interactive video advantageously incorporate (1) inexpensive transcoding from a higher to a lower bit rate, preferably by only operating on a compressed stream, (2) simple bit rate control, (3) simple scalability of dimension at the destination, (4) symmetry (resulting in very inexpensive decode and encode), and (5) a prioritized compressed stream in addition to acceptable rate-distortion performance. None of the current standards (Motion JPEG, MPEG and H.261) possess all of these characteristics. In particular, no current standard has a facility to transcode from a higher to a lower bit rate efficiently. In addition, all are computationally expensive.

The present invention overcomes the aforenoted and other problems and incorporates the desired characteristics noted above. It is particularly directed to the art of video data compression, and will thus be described with specific reference thereto. It is appreciated, however, that the invention will have utility in other fields and applications.

SUMMARY OF THE INVENTION

A method and apparatus for compressing and decompressing a video image is provided. The method, which is implemented in the complementary apparatus, comprises receiving input data representing an image or other signal data and successively performing i levels of a first table lookup operation to obtain, for example, $2^i:1$ compressed data representing a subband transform, e.g., DWT, of the input data followed by vector quantization thereof.

In accordance with another aspect of the present invention, the compressed data (which may also be transcoded at a gateway) is transmitted to a receiver.

In accordance with another aspect of the present invention, the compressed data is received at a receiver and multiple stages of a second table lookup operation are performed to selectively obtain decompressed data representing at least a partial inverse subband transform of the compressed data.

One advantage of the present invention is that encoding and decoding are accomplished solely by table lookups. This results in very efficient implementations. For example, this algorithm enables 30 frames/sec encoding (or decoding) of CIF (320×240) resolution video on Sparc 2 class machines with just 50% CPU loading.

Another advantage of the present invention is that, since only table lookups are utilized, the hardware implemented to perform the method is relatively simple. An address generator and a limited number of memory chips accomplish the method. The address generator could be a microsequencer, a gate array, an FPGA or a simple ASIC.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

DESCRIPTION OF THE DRAWINGS

The present invention exists in the construction, arrangement, and combination, of the various parts of the device, whereby the objects contemplated are attained as hereinafter more fully set forth, specifically pointed out in the claims, and illustrated in the accompanying drawings in which:

DETAILED DESCRIPTION OF THE PREFERRED EMBODIMENTS

Figure 3:
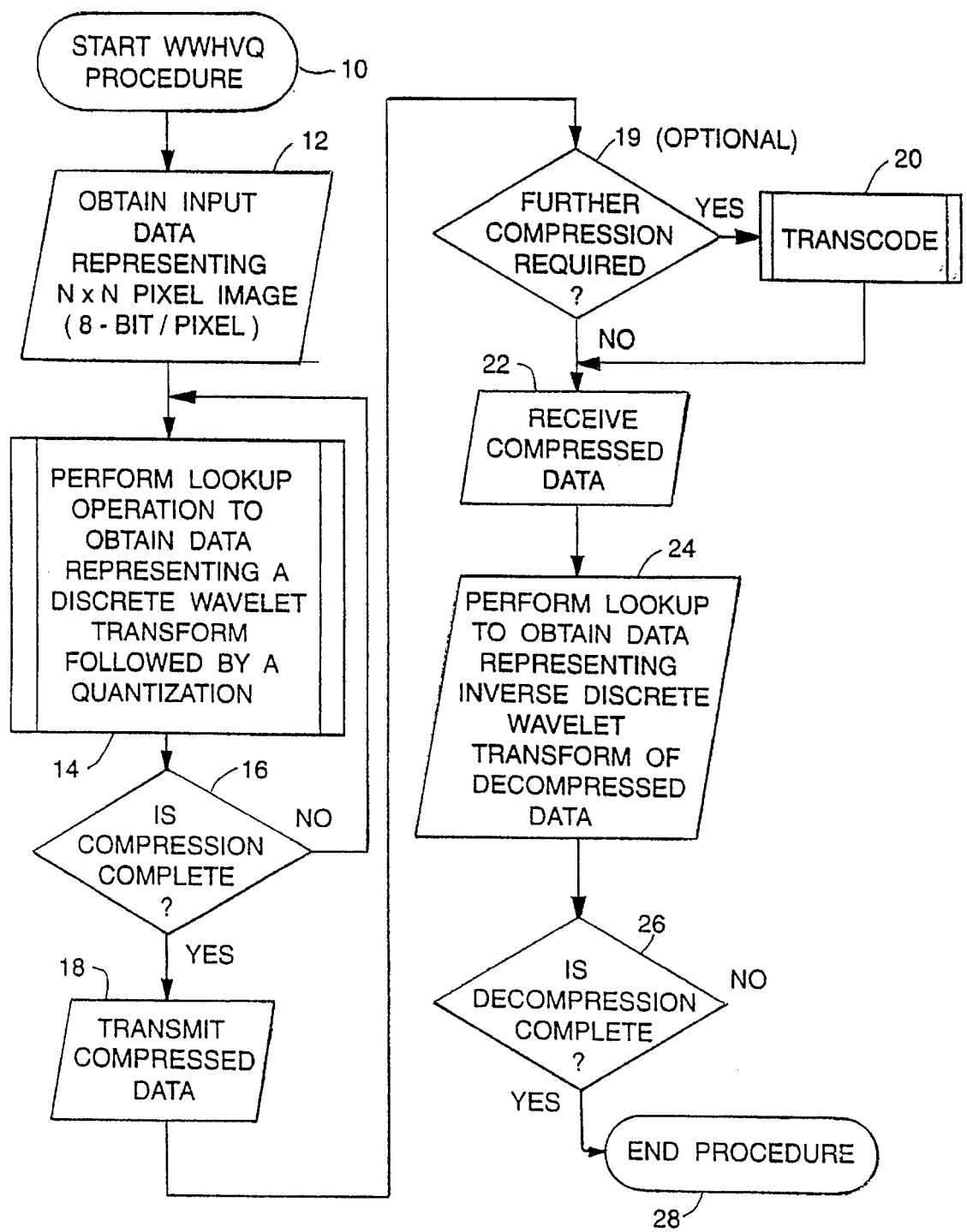
FIG. 3 is a flowchart representing the preferred method of the present invention.

Referring now to the drawings wherein the showings are for the purposes of illustrating the preferred embodiments of the invention only and not for purposes of limiting same, FIG. 3 provides a flowchart of the overall preferred embodiment. It is recognized that the method is suitably implemented in the structure disclosed in the following preferred embodiment and operates in conjunction with software based control procedures. However, it is contemplated that the control procedure be embodied in other suitable mediums.

As shown, the WWHVQ procedure is initiated by obtaining, or receiving in the system implementing the method, input data representing an N×N pixel image where 8 bits represent a pixel (steps 10 and 12). A look-up operation is performed to obtain data representing a subband transform followed by a vector quantization of the data (step 14). In the preferred embodiment, a discrete wavelet transform comprises the subband transform. However, it is recognized that other subband transforms will suffice. Upon completion of the look-up, a data compression has been performed. Preferably, such compression is 2:1. Further stages will result in further compression of the data, e.g., 4:1, 8:1, 16:1, 32:1, 64:1, . . . etc. It is appreciated that other compression ratios are possible and may be desired in certain applications. Successive compression stages, or iterations of step 14, compose the hierarchy of the WWHVQ. Accordingly, a determination is made whether the compression is complete (step 16). If the compression is incomplete, further look-up is performed. If the desired compression is achieved, however, the compressed data is transmitted using any known transmitter (step 18). It is then determined at, for example, a network gateway, whether further compression is required (step 19). If so, transcoding is performed in an identical manner as the encoding (step 20). In any event, the receiver eventually receives the compressed data using known receiving techniques and hardware (step 22). Subsequently, a second look-up operation is performed to obtain data representing an inverse subband transform, preferably an inverse DWT, of decompressed data (step 24). After one complete stage, the data is decompressed. Further stages allow for further decompression of the data to a desired level. A determination is then made whether decompression is complete (step 26). If the decompression is incomplete, further look-ups are performed. If, however, the decompression is complete, the WWHVQ procedure is ended (step 28).

The embodiment of FIG. 3 uses a hierarchical coding approach, advantageously incorporating particular features of hierarchical vector quantization (HVQ) and the discrete wavelet transform (DWT). HVQ is extremely fast, though its performance directly on images is mediocre. On the other hand, the DWT is computationally demanding, though it is known to greatly reduce blocking artifacts in coded images. The DWT coefficients can also be weighted to match the human visual sensitivity in different frequency bands. This results in even better performance, since giving higher weights to the more visually important bands ensures that they will be quantized to a higher precision. The present invention combines HVQ and the DWT in a novel manner, to obtain the best qualities of each in a single system, Weighted Wavelet HVQ (WWHVQ).

The basic idea behind WWHVQ is to perform the DWT filtering using table lookups. Assume the input symbols have already been finely quantized to p bits of precision. For monochrome image data, p=8 is typical. (For color image data, each color plane can be treated separately, or they can be vector quantized together into p bits). In principle it is possible to filter the data with an L-tap filter with one lookup per output symbol using a table with a Lp bit address space. Indeed, in principle it is possible to perform both the low-pass filtering and the high-pass filtering simultaneously, by storing both low-pass and high-pass results in the table. Of course, such a table is clearly infeasible if L and p are even moderately large. We take an approach similar to that of HVQ: for a filter of length L, $\log_2 L$ "substages" of table lookup can be used, if each table has 2p input bits and p output bits. The p output bits of the final substage represents a 2-dimensional vector: one symbol from the low-pass band and a corresponding symbol from the high-pass band. Thus, the wavelet coefficients output from the table are vector quantized. In this sense, the DWT is tightly integrated with the HVQ. The wavelet coefficients at each stage of the DWT are vector quantized, as are the intermediate results (after each substage) in the computation of the wavelet coefficients by table lookup.

Figure 4A:
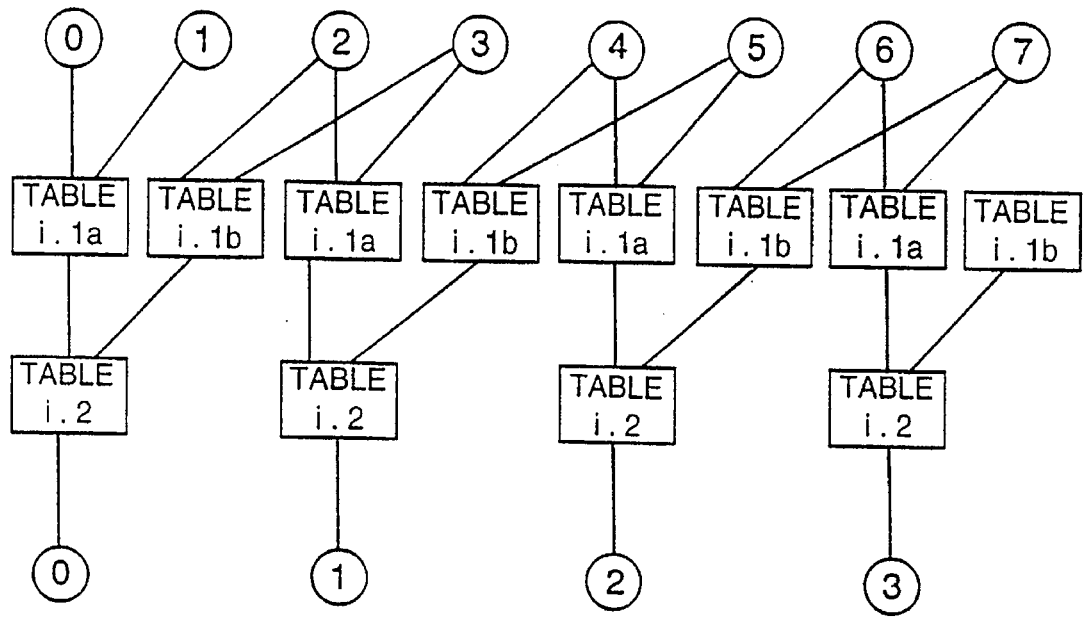
FIGS. 4a–b are graphical representations of a single stage of an encoder performing a WWHVQ in the method of FIG. 3.

FIG. 4a shows one stage i of the WWHVQ, organized as $\log_2 L$ substages of table lookup. Here, L=4, so that the number of substages is two. Note that the filters slide over by two inputs to compute each output. This corresponds to downsampling (decimation) by a factor of 2, and hence a reduction in bit rate by factor of 2. The second stage of the WWHVQ operates on coded outputs from the first stage, again using $\log_2 L$ substages of table lookup (but with different tables than in the first stage) and so on for the following stages. It is recognized that each of a desired number of stages operates in substantially the same way so that the p bits at the output of stage i represent a $2^i:1$ compression. The p bits at the output of the final stage can be transmitted directly (or indirectly via a variable-length code). The transmitted data can be further compressed, or "transcoded", for example, at a gateway between high and low capacity networks, simply by further stages of table lookup, each of which reduces the bit rate by a factor of 2. Hence both encoding and transcoding are extremely simple.

The tables in the first stage (i=1) may be designed as follows, with reference to FIG. 4a. In this discussion, we shall assume that the input signal $X=(x(0),x(1),\ldots,x(N-1))$ is one-dimensional. Those skilled in the art will have little difficulty generalizing the discussion to image data. First decompose the input signal $X_{L0}=X$ into low-pass and high-pass signals $X_{L1}$ and $X_{H1}$, each of length N/2. This produces a sequence of 2-dimensional vectors, $$x(i)=[x_{L1}(i),x_{H1}(i)], \text{ for } i=0, 1, \ldots, N/2-1,$$

where $$x_{L1}(i)=1(0)x(2i)+1(1)x(2i+1)+1(2)x(2i+2)+1(3)x(2i+3)$$

and $$x_{H1}(i)=h(0)x(2i)+h(1)x(2i+1)+h(2)x(2i+2)+h(3)x(2i+3)$$

Such 2-dimensional vectors are used to train an 8-bit vector quantizer $Q_{1.2}$ for Table 1.2. (Table i.2. where i=1) Likewise, 2-dimensional vectors $$[1(0)x(2i)+1(1)x(2i+1),h(0)x(2i)+h(1)x(2i+1)],$$

are used to train an 8-bit vector quantizer $Q_{1.1a}$ for Table 1.1a (Table i.1a where i=1), and 2-dimensional vectors $$[1(2)x(2i+2)+1(3)x(2i+3), h(2)x(2i+2)+h(3)x(2i+3)],$$

are used to train an 8-bit vector quantizer $Q_{1.1}b$ for Table 1.1b (Table i.1b where i=1). All three quantizers are trained to minimize the expected weighted squared error distortion measure $d(x,y)=[w_{L1}(x_0-y_0)]^2+[w_{H1}(x_1-y_1)]^2$, where the constants $w_{L1}$ and $w_{H1}$ are proportional to the human perceptual sensitivity (i.e., inversely proportional to the just noticeable contrast) in the low-pass and high-pass bands, respectively. Then Table 1.1a (Table i.1a where i=1) is filled so that it assigns to each of its $2^{16}$ possible 2-dimensional input vectors $[x_0,x_1]$ the 8-bit index of the codeword $[y_{L1.1a}, y_{H1.1a}]$ of $Q_{1.1a}$ nearest to $[1(0)x_o+1(1)x_1,h(0)x_o+h(1)x_1]$ in the weighted squared error sense. Table 1.1b (Table i.1b where i=1) is filled so that it assigns to each of its $2^{16}$ possible 2-dimensional input vectors $[x_2,x_3]$ the 8-bit index of the codeword $[y_{L1.1b}, y_{H1.1b}]$ $Q_{1.1b}$ nearest to $[1(2)x_2+1(3)x_3, h(2)x_2+h(3)x_3]$ in the weighted squared error sense. And finally Table 1.2 (Table i.2 where i=1) is filled so that it assigns to each of its $2^{16}$ possible 4-dimensional input vectors (i.e., the cross product of all possible 2-dimensional output vectors from the first stage), for example, $[y_{L1.1}a, y_{H1.1}a, y_{L1.1b}, y_{H1.1b}]$, the 8-bit index of the codeword $[y_{L1}, y_{H1}]$ of $Q_{1.2}$ nearest to $[y_{L1.1a}+y_{L1.1b}, y_{H1.1a}+y_{H1.1b}]$ in the weighted squared error sense.

Figure 4B:
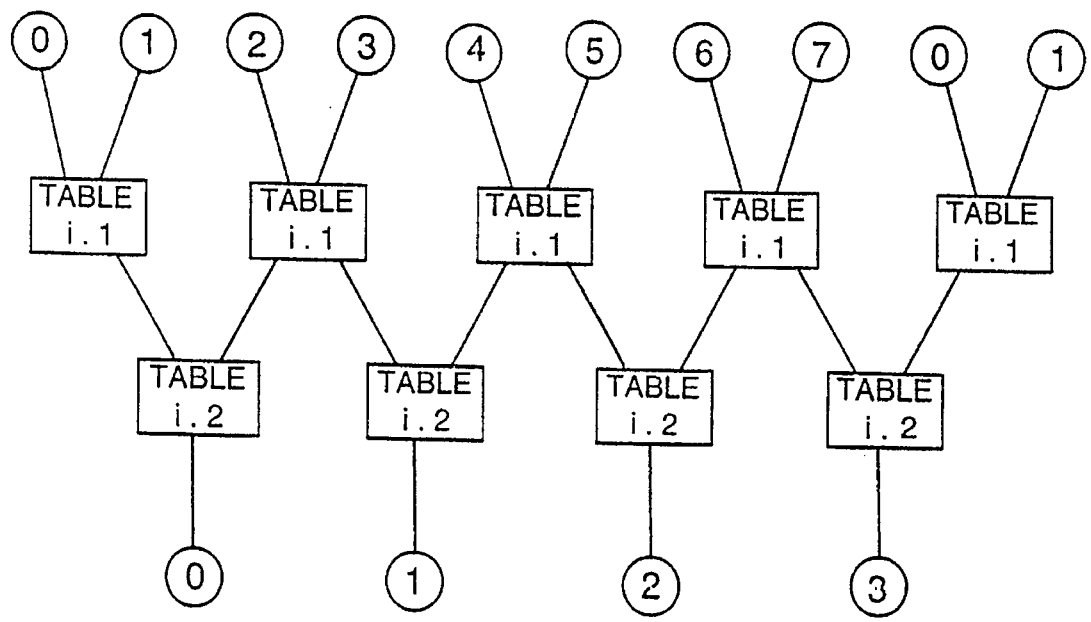

For a small cost in performance, it is possible to design the tables so that Table 1.1a (Table i.1a where i=1) and Table 1.1b (Table i.1b where i=1) are the same, for instance, Table 1.1, if i=1 (Table i.1 where i=1) in FIG. 4b. In this case, Table 1.1 (Table i.1 where i=1) is simply a table lookup version of a 2-dimensional VQ that best represents pairs of inputs $[x_o, x_1]$ in the ordinary (unweighted) squared error sense. Then Table 1.2 (Table i.2 where i=1) is filled so that it assigns to each of its $2^{16}$ possible 4-dimensional input vectors (i.e., the cross product of all possible 2-dimensional output vectors from the first stage), for example, $[y_0, y_1, y_2, y_3]$, the 8-bit index of the codeword $[y_{L1}, y_{H1}]$ of $Q_{1.2}$ nearest to $[1(0)y_o+1(1)y_1+1(2)y_2+1(3)y_3,h(0)y_o+h(1)y_1+h(2)y_2+h(3)y_3]$ in the weighted squared error sense. Making Tables 1.1a and 1.1b (Tables i.1a and i.1b where i=1) the same would result in a savings of both table memory and computation, as shown in FIG. 4b. The corresponding signal flow diagram is shown in FIG. 4c.

Referring again to FIG. 4a, the tables in the second stage (i=2) are just slightly more complicated. Decompose the input signal $X_{L1}$, of length N/2, into low-pass and high-pass signals $X_{L2}$ and $X_{H2}$, each of length N/4. This produces a sequence of 4-dimensional vectors, $x(i)=[x_{L2}(i), x_{H2}(i), x_{H1}(2i),x_{H1}(2i+1)]$, for i=0,1, . . . ,N/4−1, where $x_{L2}(i)=1(0)x_{L1}(2i)+1(1)x_{L1}(2i+1)+1(2)x_{L1}(2i+2)+1(3)x_{L1}(2i+3)$ and $x_{H2}(i)=h(0)x_{L1}(2i)+h(1)x_{L1}(2i+1)+h(2)x_{L1}(2i+2)+h(3)x_{L1}(2i+3)$. Such 4-dimensional vectors are used to train an 8-bit vector quantizer $Q_{2.2}$ for Table 2.2. (Table i.2 where i=2). Likewise, 4-dimensional vectors $[1(0)x_{L1}(2i)+1(1)x_{L1}(2i+1),h(0)x_{L1}(2i)+h(1)x_{L1}(2i+1),x_{H1}(2i),x_{H1}(2i+1)]$, are used to train an 8-bit vector quantizer $Q_{2.1a}$ for Table 2.1a, (Table i.1a where i=2) and 2-dimensional vectors $[1(2)x_{L1}(2i+2)+1(3)x_{L1}(2i+3), h(2)x_{L1}(2i+2)+h(3)x_{L1}(2i+3), x_{H1}(2i+2), x_{H1}(2i+$ used to train an 8-bit vector quantizer $Q_{2.1b}$ for Table 2.1b (Table i.1b where i=2). All three quantizers are trained to minimize the expected weighted squared error distortion measure $d(x,y)=[W_{L2}(x_0-y_0)]^2+[w_{H2}(x_1-y_1)]^2+[w_{H1}(x_2-y_2)]^2+[w_{H1}(x_3-y_3)]^2$, where the constants $w_{L2}$, $w_{H2}$ and $w_{H1}$ are proportional to the human perceptual sensitivities in their respective bands. Then Table 2.1a (Table i.1a where i=2) is filled so that it assigns to each of its $2^{16}$ possible 4-dimensional input vectors $[y_0, Y_1, Y_2, Y_3]$ the 8-bit index of the codeword of $Q_{2.1a}$ nearest to $[1(0)y_0+1(1)y_1,h(0)y_0+h(1)y_1,y_2,y_3]$ in the weighted squared error sense, and so on for Tables 2.1b and 2.2 (Tables i.1b and i.2 where i=2) in the second stage, and the tables in any succeeding stages.

Figure 1A:
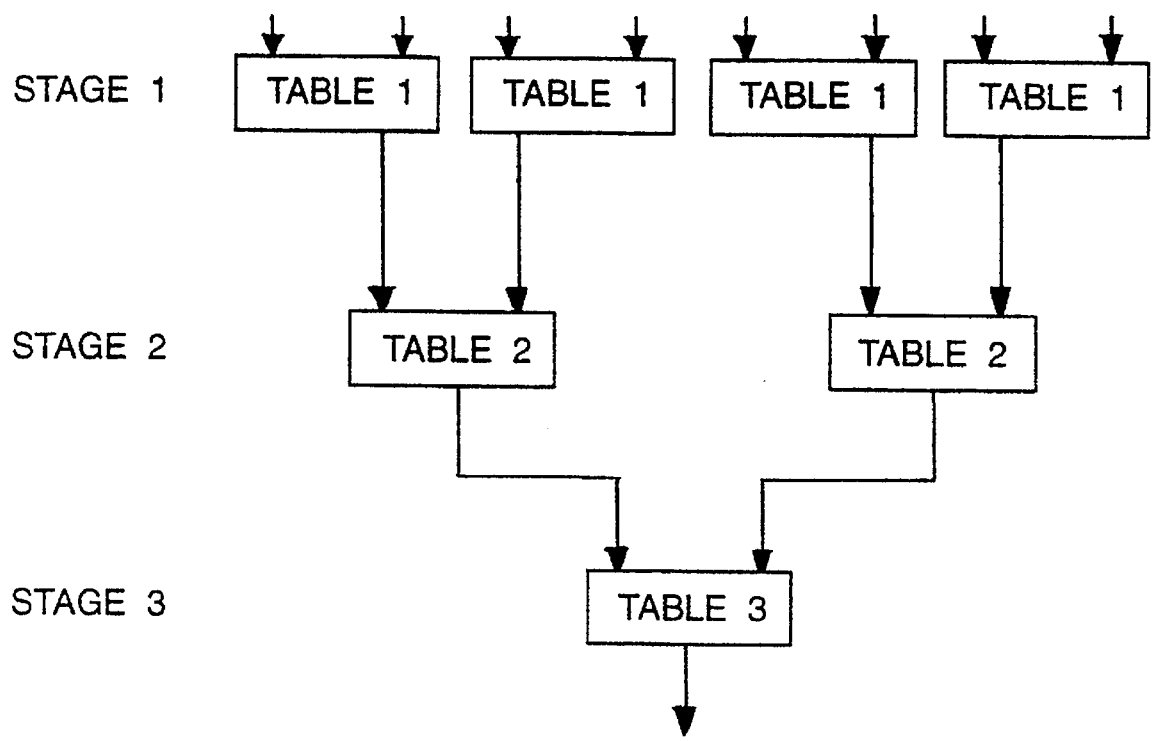
FIG. 1a illustrates a table structure of prior art HVQ.
Figure 1B:
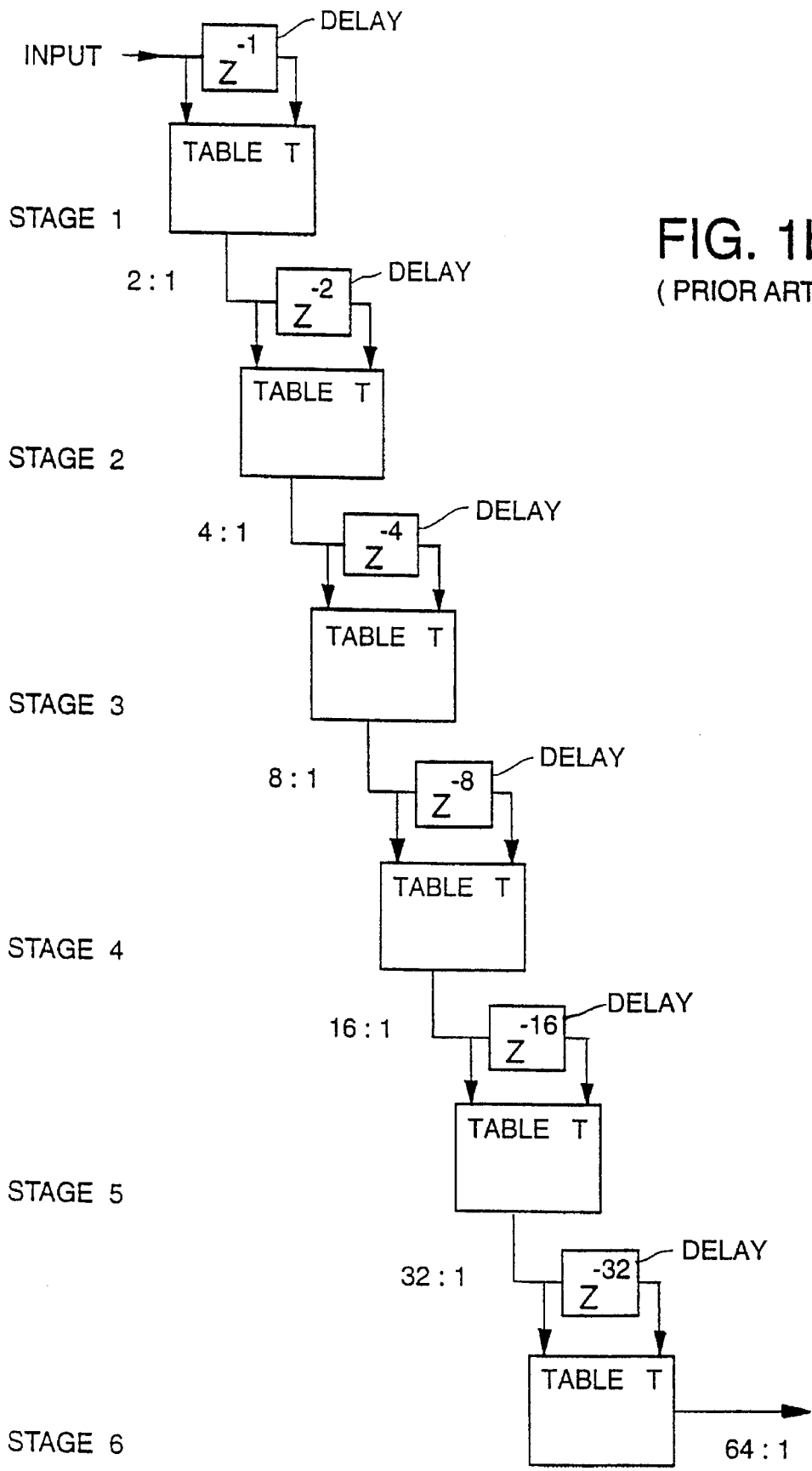
FIG. 1b is a signal flow diagram illustrating prior art HVQ for speech coding.
Figure 2A:
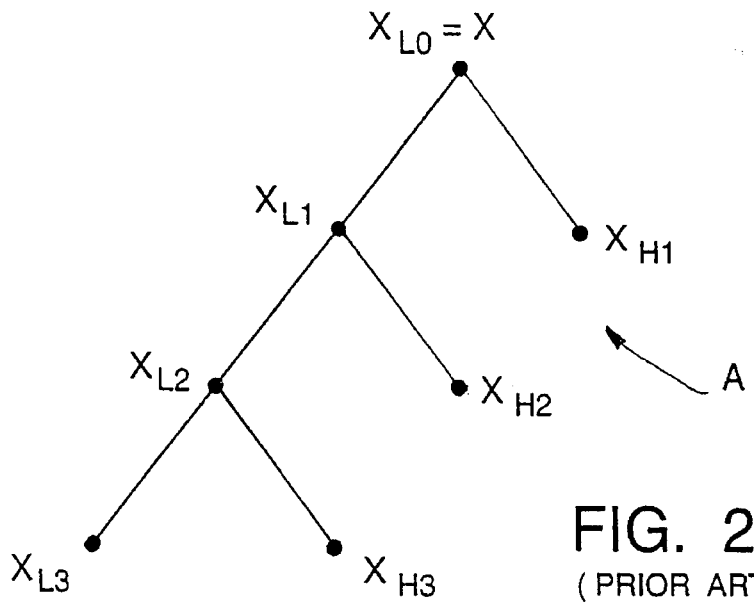
FIGS. 2a–c are a graphical representation of a prior art DWT.
Figure 2B:
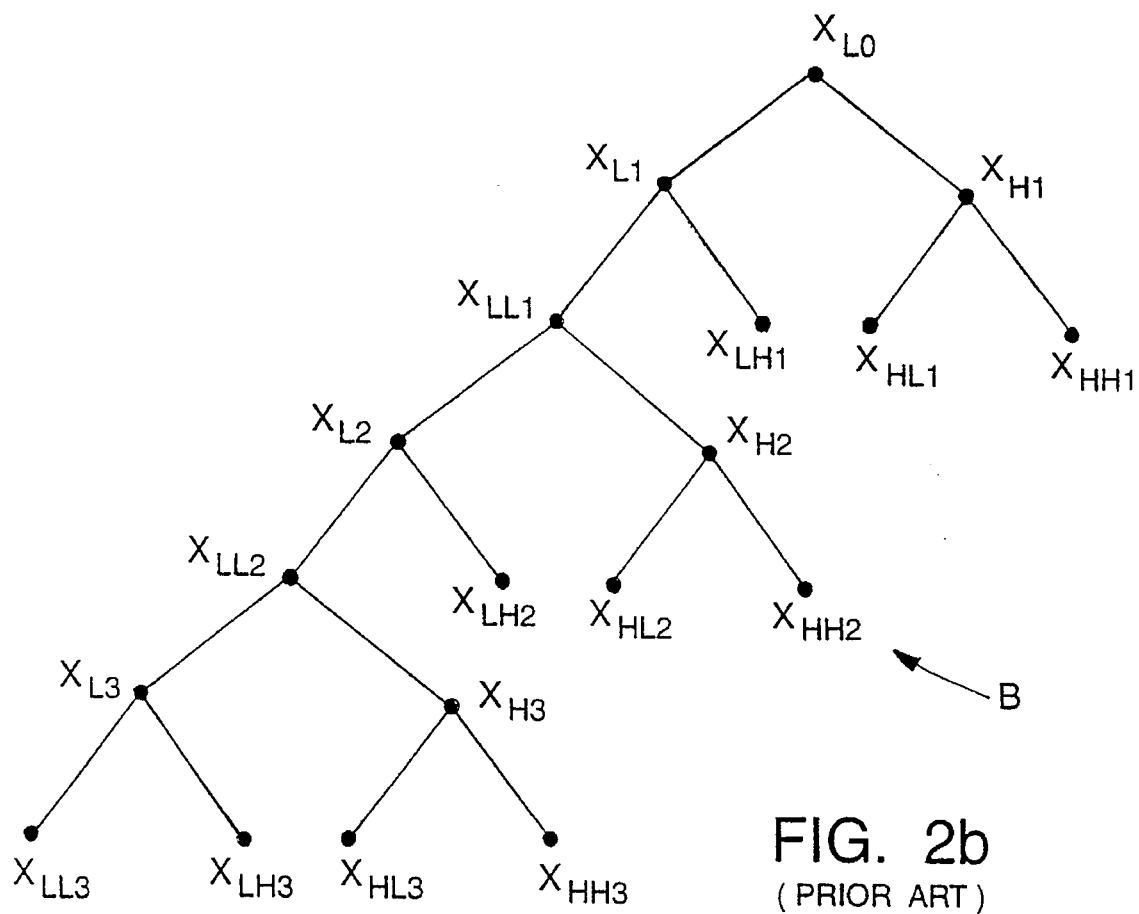
Figure 2C:
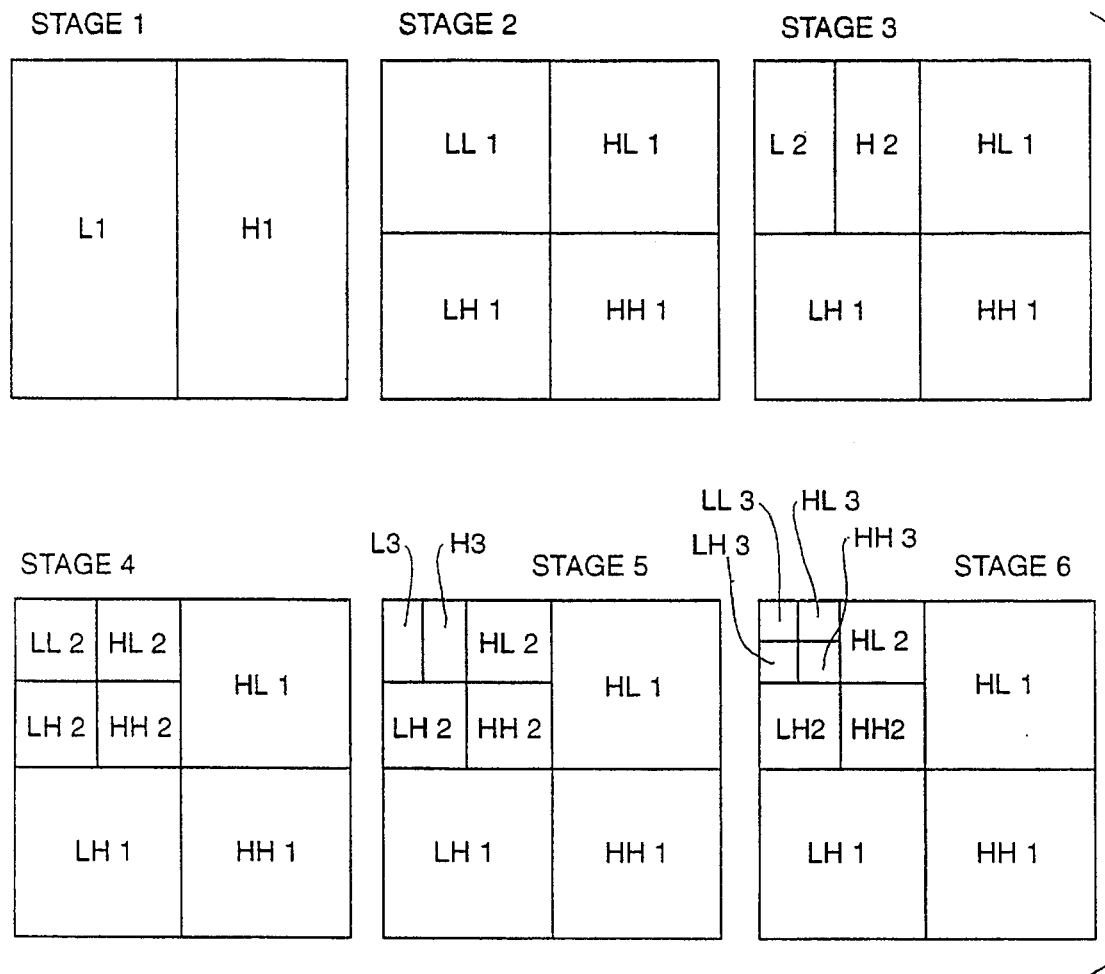

As in HVQ, in WWHVQ the vector dimension doubles with each succeeding stage. The formats of the vectors at each stage are shown as outputs of the encoder 30, graphically represented in FIG. 4c. These formats are for the case of the two-dimensional separable DWT shown in FIG. 2b.

Figure 4C:
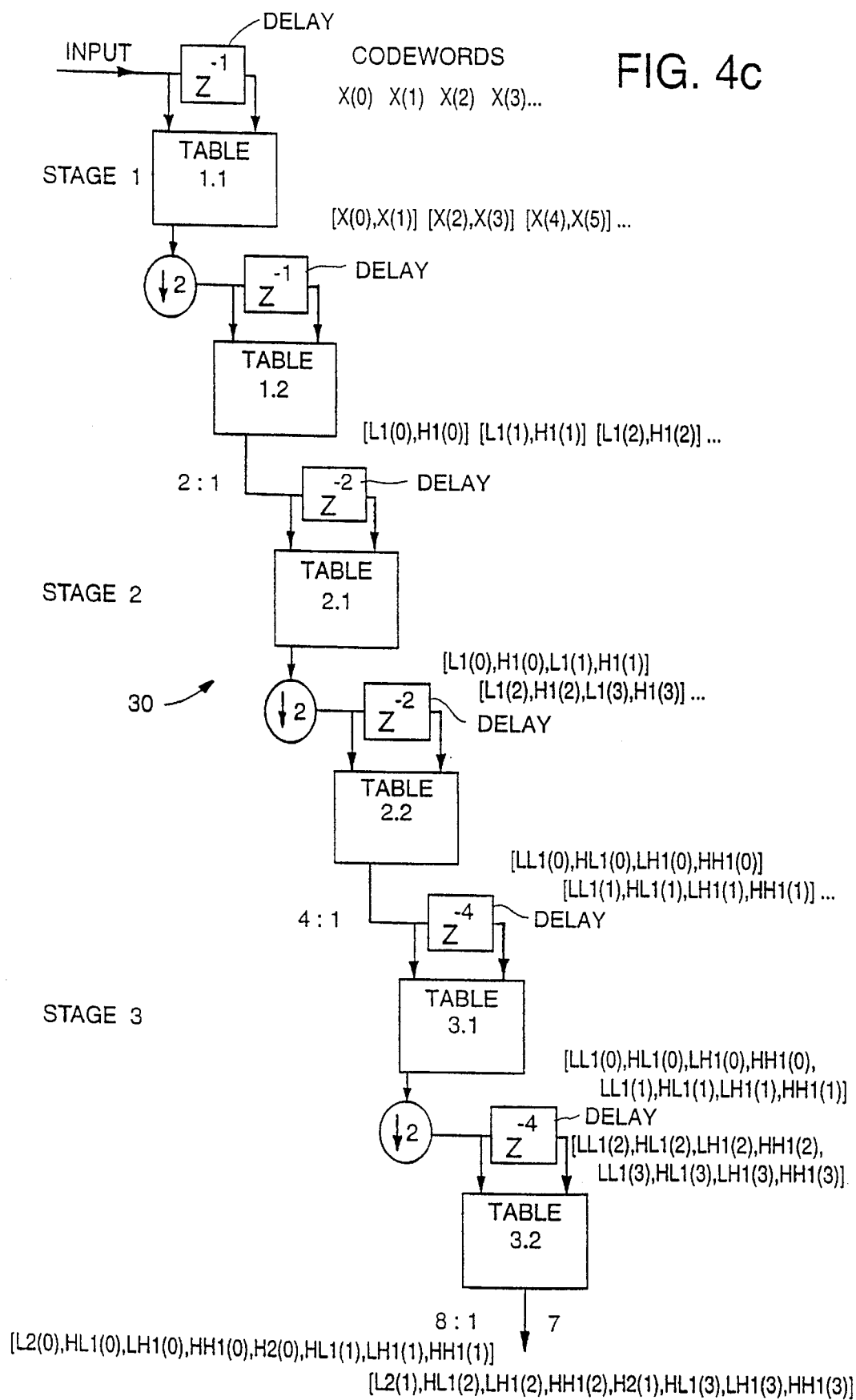
FIG. 4c is a signal flow diagram illustrating an encoder performing a WWHVQ in the method of FIG. 3.

Referring now to the case where all tables in a given substage are identical as in FIG. 4b, and 4c, if the number of inputs to a stage is S bytes, then the number of outputs is:

$$\frac{S}{2}$$

and the number of table lookups per output is log L. If the compression ratio is C, then the total number of outputs (including the outputs of intermediate stages) is:

$$N^2 \left( \frac{C-1}{C} \right)$$

for an image of size $N^2$. Thus, the total number of table lookups is:

$$N^2 \left( \frac{C-1}{C} \right) \log L.$$

If the amount of storage needed for the HVQ encoder is T, then the amount of storage needed for the WWHVQ encoder is T log L per stage.

Also shown in FIG. 4c are the respective delays Z which successively increase with each stage. The oval symbol including the ↓2 designation indicates that only one of every two outputs is selected, as those skilled in the art will appreciate.

Figure 5:
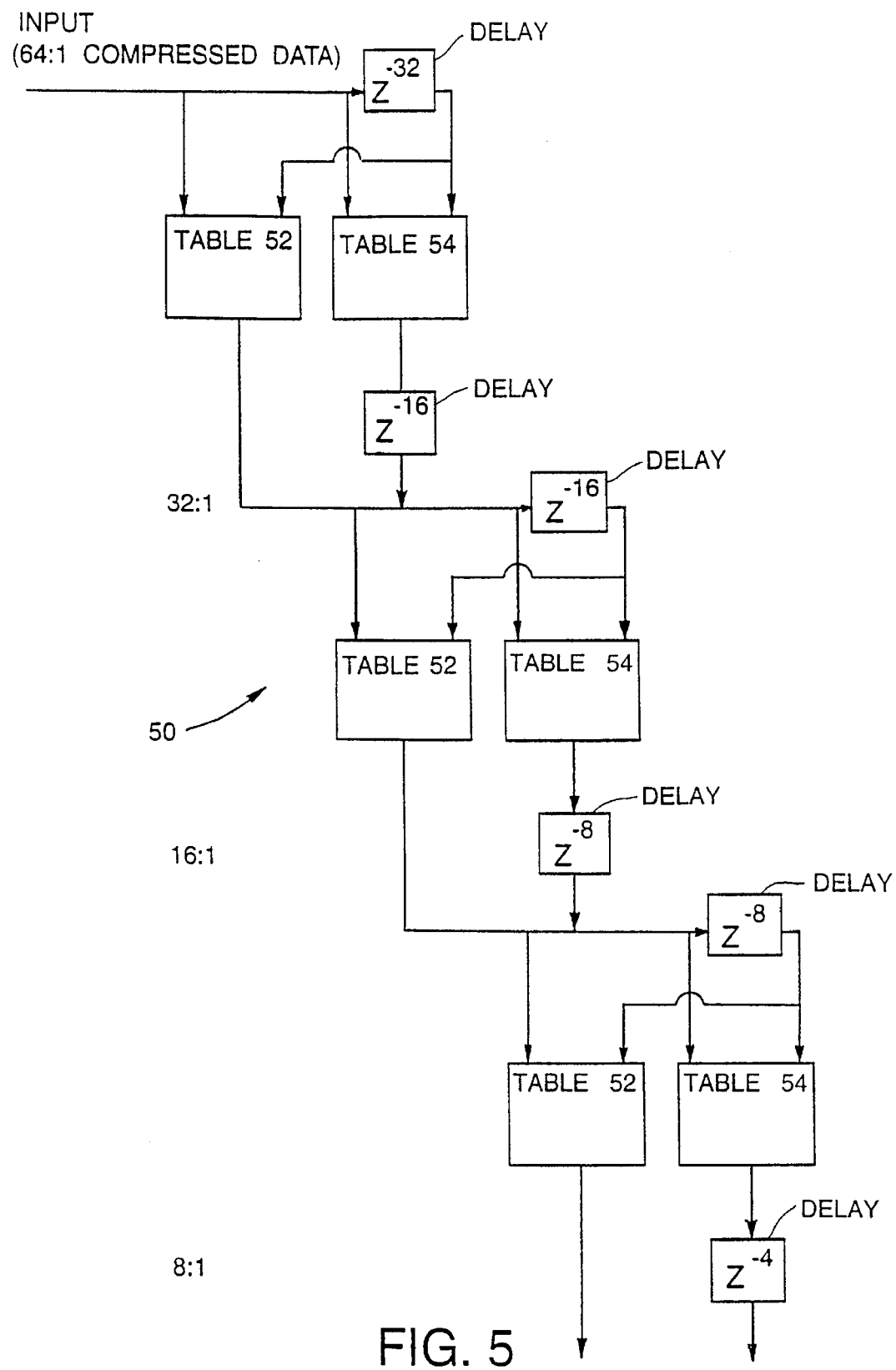
FIG. 5 is a signal flow diagram of a decoder used in the method of FIG. 3.

The WWHVQ decoder 50 which performs steps 22–26 of FIG. 3 is shown in FIG. 5. All tables of decoder 50 in a given substage are identical, similar to the encoder of FIGS. 4b and 4c. As those skilled in the art will appreciate, the odd-even split tables 52, 54 at each stage handle the interpolation by 2 that is part of the DWT reconstruction. If L=4 and the filter coefficients are h(i) and l(i), i=0, 1,2,3, then the odd table 52 computes h(1)×(i)+h(3)×(i+1) and l(1)×(i)+(i+1), while the even table 54 computes h(0)×(i)+h(2)×(i+1) and l(0)×(i)+l(2)×(i+1), where x(i)'s are the inputs to that stage. If the number of inputs to a stage is S, then the number of outputs from that stage is 2S. The total number of table lookups for the stage is:

$$S \log \frac{L}{2}.$$

If the compression ratio is C, then the total number of outputs (including outputs of intermediate stages) is:

$$2N^2 \left( \frac{C-1}{C} \right)$$

for an image of size $N^2$. Thus, the total number of table lookups is:

$$N^2 \left( \frac{C-1}{C} \right) \log \frac{L}{2}.$$

If the amount of storage needed for the HVQ encoder is T, then the amount of storage needed for the WWHVQ decoder per stage is:

$$T \left( \log \frac{L}{2} + 1 \right) = T \log L.$$

All the storage requirements presented are for 8-bits per pixel input. For color images (YUV, 4:2:2 format) the storage requirements double. Similarly the number of table lookups also doubles for color images.

Figure 6:
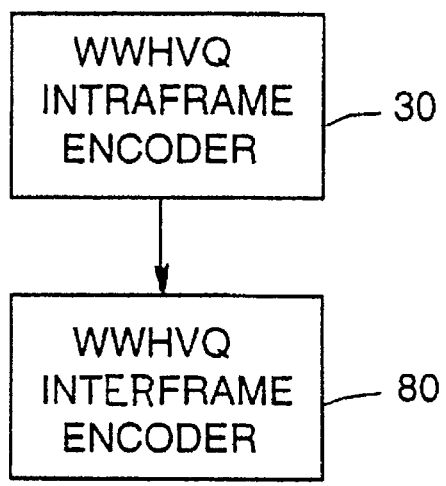
FIG. 6 is a block diagram of a system using 3-D subband coding in connection with the method of FIG. 3.
Figure 7:
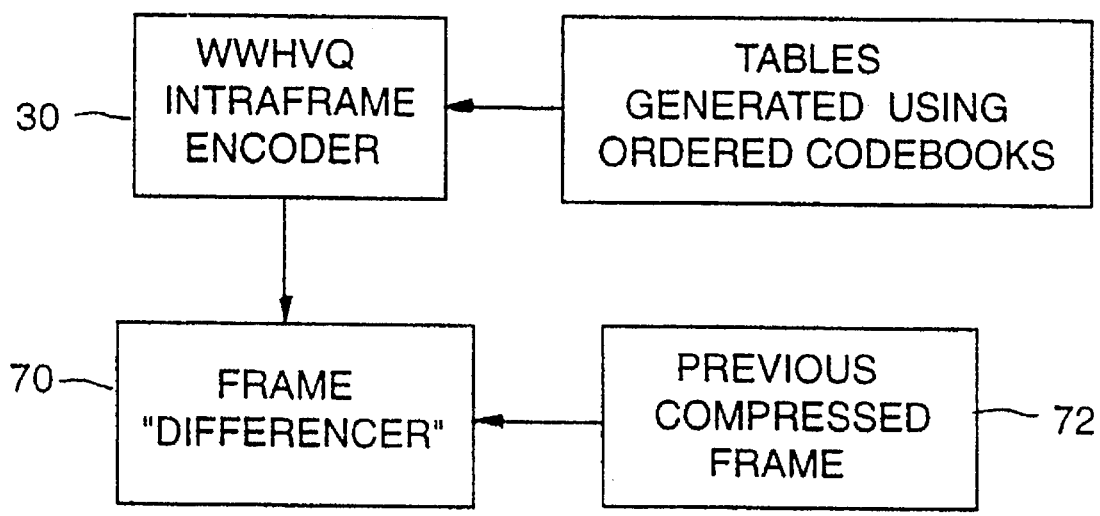
FIG. 7 is a block diagram of a system using frame differencing in connection with the method of FIG. 3.

As shown in FIGS. 6 and 7, there are two options for handling motion and interframe coding using the present method. In a first mode (FIG. 6), the subband coding is extended and followed by a vector quantization scheme that allows for intraframe coding performed as described in connection with encoder 30 to interframe coding, designated by reference numeral 80. This is similar to 3-D subband coding.

The second way (FIG. 7) of handling motion is to use a simple frame differencing scheme that operates on the compressed data and uses an ordered codebook to decide whether to transmit a certain address. Specifically, the WWHVQ encoder 30 shown in FIG. 4c is used in conjunction with a frame differencer 70. The frame differencer 70 uses a current frame encoded by encoder 30 and a previous frame 72 as inputs to obtain a result.

Some of the features of the WWHVQ of the present invention are:

Transcoding

The sender transmits a video stream compressed at 16:1. The receiver requests the "gateway" for a 32:1 stream (or the gateway sees that the slower link can only handle 32:1). All the gateway has to do to achieve this transcoding is do a further level of table lookup using the data it receives (at 16:1) as input. This is extremely useful, especially when a large range of bandwidths have to be supported, as, for example, in a heterogenous networked environment.

Dimension Scaling

If the video stream is compressed up to J stages, then the receiver has a choice of [J]+i image sizes without any extra effort. For example, if a 256×256 image is compressed to 6 stages (i.e., 64:1), then the receiver can reconstruct a 32×32 or 64×64 or 128×128 or 256×256 image without any overhead. This is done by just using the low pass bands LL available at the even numbered stages (see FIG. 3). Also, since the whole method is based upon table look-ups, it is very easy to scale the image up, i.e., the interpolation and lowpass filtering can be done ahead of time. Note also that all this is done on the compressed bit-stream itself. In standard video compression schemes both down and up scaling is achieved by explicitly filtering and decimating or interpolating the input or output image.

Motion

There are two simple options for handling motion. Simple frame differencing can be applied to the compressed data itself. Another option is to use a 3-D subband coding scheme in which the temporal dimension is handled using another WWHVQ in conjunction with the spatial WWHVQ. The wavelet used here can be different (it is different in practice). In a preferred implementation, motion detection and thresholding are accomplished. This is done on the compressed data stream. The current compressed frame and the previous compressed frame are compared using a table lookup. This generates a binary map which indicates places where motion has occurred. This map is used to decide which blocks (codewords) to send and a zero is inserted in place of stationary blocks. This whole process is done in an on-line manner with a run-length encoder. The table that is used to create the binary map is constructed off-line and the motion threshold is set at that time.

Dithering

Typically, the decoder has to do color space conversion and possibly dithering (for <24-bit displays) on the decoded stream before it can display it. This is quite an expensive task compared to the complexity of the WWHVQ decoder. But since the WWHVQ decoder is also based upon table lookups, these steps are incorporated into the decoder output tables. Other than speeding up the decoder, the other major advantage of this technique is that it makes the decoder completely independent of the display (resolution, depth etc.). Thus, the same compressed stream can be decoded by the same decoder on two different displays by just using different output tables.

The WWHVQ method is very simple and inexpensive to implement in hardware. Basically, since the method predominantly uses only table lookups, only memory and address generation logic is required. The architectures described below differ only in the amount of memory they use versus the amount of logic. Since alternate stages operate on row and column data, there is a need for some amount of buffering between stages. This is handled explicitly in the architectures described below. All the storage requirements are given for 8-bits per pixel input. For color images (YUV, 4:2:2 format) the storage requirements double. But the timing information remains the same, since the luminance and chrominance paths can be handled in parallel in hardware. Also, as noted above, two simple options are available for interframe coding in WWHVQ. The 3-D subband coding option is implemented as an additional WWHVQ module, while the frame differencing option is implemented as a simple comparator.

Figure 8:
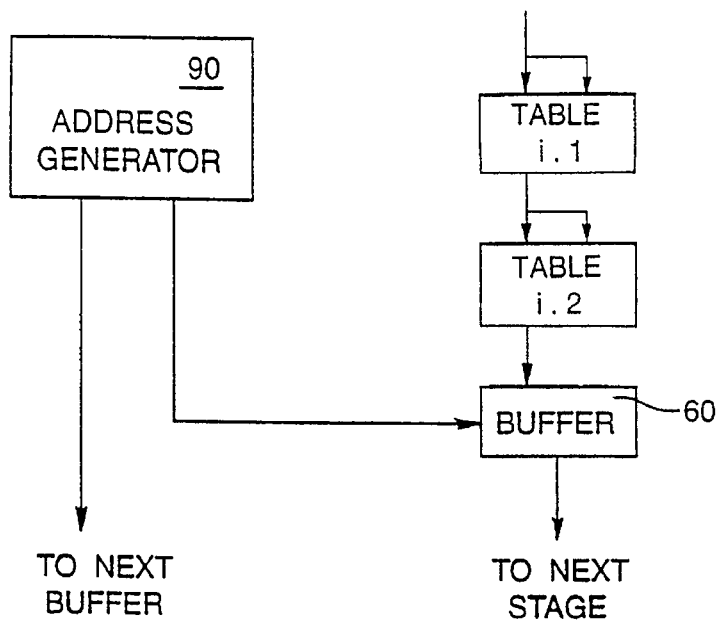
FIG. 8 is a schematic representation of the hardware implementation of the encoder of the method of FIG. 3.

Referring now to FIG. 8, each one of the tables i.1 (or i.1a and i.1b) and i.2 of the present invention are mapped onto a memory chip (64 KB in this case). The row-column alternation between stages is handled by using a buffer 60 of NL bytes between stages, where N is the row dimension of the image and L is the length of the wavelet filter. For example, between stages 1 and 2 this buffer is written in row format (by stage 1) and read in column format by stage 2. Some simple address generation logic is required. Accordingly, address generator 90 is provided. The address generator 90 is any suitable device such as an incrementer, an accumulator, or an adder plus some combinational glue logic. However, this architecture is almost purely memory. The input image is fed as the address to the first memory chip whose output is fed as the address to the next memory chip and so on.

The total memory requirements for the encoder 30 and the decoder 50 are T log L+NL(M−1) bytes, where M is the number of stages. For example, the WWHVQ encoder and decoder shown in FIGS. 3 and 5 need 64 KB for each table i.1, i.2 plus the buffer memory 60. If the number of stages, M, is 6, the wavelet filter size, L, is 4 and the image row dimension, N, is 256, then the amount of memory needed is 768 KB+5 KB=773 KB. The number of 64 KB chips needed is 12 and the number of 1 KB chips needed is 5. The throughput is obviously maximal, i.e., one output every block cycle. The latency per stage is NL clocks, except for the first stage which has a latency of 1 clock cycle. Thus the latency after the m stages is (m−1)NL+1 clocks.

The main advantage of this architecture is that it requires almost no glue logic and is a simple flow through architecture. The disadvantages are that the number of chips required scales with the number of stages and board area required becomes quite large. The capacity of each chip in this architecture is quite small and one can easily buy a cheap memory chip which has the capacity of all these chips combined. This is considered in the architecture of FIG. 9.

Figure 9:
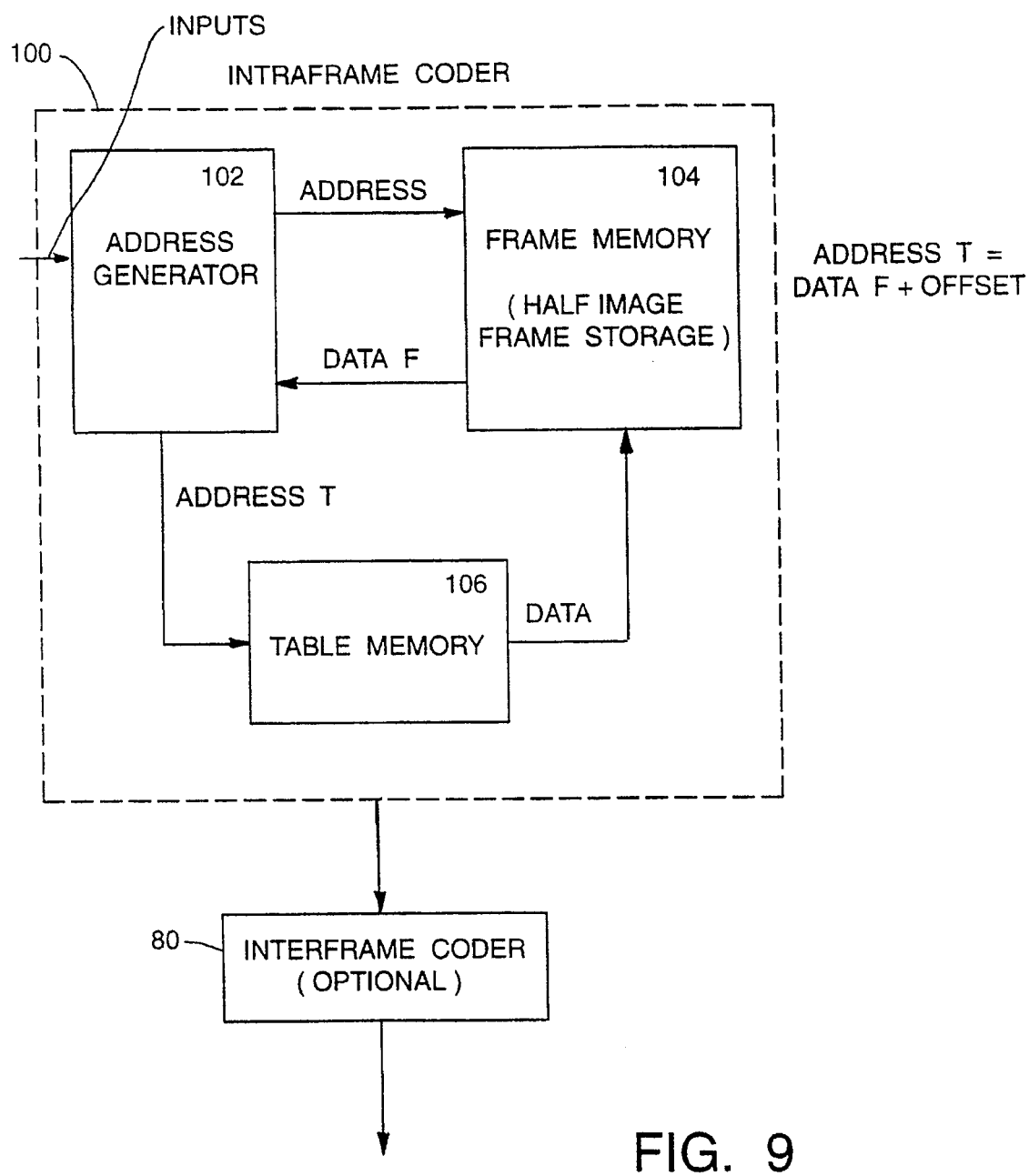
FIG. 9 is a schematic representation of another hardware implementation of the encoder of the method FIG. 3.

Referring now to FIG. 9, if all the tables are loaded onto one memory chip 100, then an address generator 102 and a frame buffer 104 are used. In this architecture one stage of the WWHVQ is computed at a time. In fact, each sub-level of a stage is computed one at a time. So in the encoder 30 the table lookups for table i.1 are done first, the $$\frac{N^2}{2}$$

values that result are stored in the (half) frame buffer 104. These values are then used as input for computing the table lookups of table i.2 and so on. Clearly, the most frame storage needed is:

$$\frac{N^2}{2}$$

bytes. The frame buffer 104 also permits simple row-column alternation between stages.

The address generator 102 has to generate two addresses, one for the table memory chip 106 and another for the frame memory chip 104. The address for the frame memory chip 104 is generated by a simple incrementer, since the access is uniform. If the number of taps in the wavelet filter is L, then the number of levels per stage (i.e., wavelet tables) for the encoder 30 is log L (it is log L/2 for the decoder). Each of the tables i.1 and i.2 are of size tsize. The output of level q of stage m is computed. If the output of the frame memory 104 is y(i), then the address that the address generator 102 computes for the table memory 106 is y(i)+offset, where offset=[(m−1)log L+(q−1)]*tsize. This is assuming the tables i.1, i.2 are stored in an ordered manner. The multiplications involved in the computation of offset need not be done since offset can be maintained as a running total. Each time one level of computation is completed offset=offset+ tsize. Thus, the address generator 102 is any suitable device such as an incrementer, an accumulator, or an adder plus some combinational glue logic.

The total memory requirements for this architecture is:

$$T \log L + \frac{N^2}{2}$$

bytes spread out over two chips, the frame memory 104 and the table memory 106. For the example considered in the previous section this translates to 800 KB of memory (768 KB+32 KB). The throughput is one output every clock cycle. The latency per stage is:

$$\frac{N^2}{2^{m-1}} \log L,$$

where m is the stage number. The first stage has a latency of just log L. Thus, the latency after m stage is:

$$N^2 \left(1 - \frac{1}{2^{m-1}}\right) \log L + 1$$

The advantages of this architecture are its scalability, simplicity and low chip count. By using a large memory chip 100 (approximately 2 MB or more), various configurations of the encoder and the decoder, i.e., various table sizes and precision, may be considered and, the number of stages can be scaled up or down without having to change anything on the board. The only disadvantage is latency, but in practice the latency is well below 50 milliseconds, which is the threshold above which humans start noticing delays.

It is important to note the connection between the requirement of a half frame memory 104 and the latency. The latency is there primarily due to the fact that all the outputs of a stage are computed before the next stage computation begins. These intermediate outputs are stored in the frame memory 104. The reason the latency was low in the previous architecture was that the computation proceeded in a flow through manner, i.e., begin computing the outputs of stage m before all the outputs of stage m–1 were computed.

Figure 10:
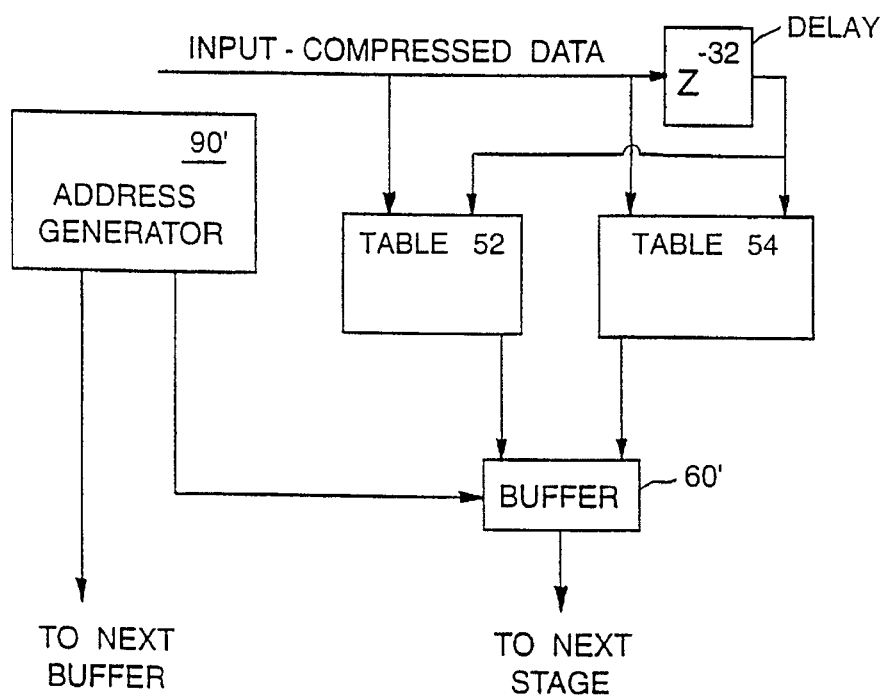
FIG. 10 is a schematic representation of the hardware implementation of the decoder of the method of FIG. 3.

FIG. 10 illustrates the architecture for the decoder similar to the encoder of FIG. 8. As shown, an address generator 90' is connected to a buffer 60' having inputs of the odd and even tables 52 and 54. The output of the buffer connects to the next stage and the address generator also connects to the next buffer.

Figure 11:
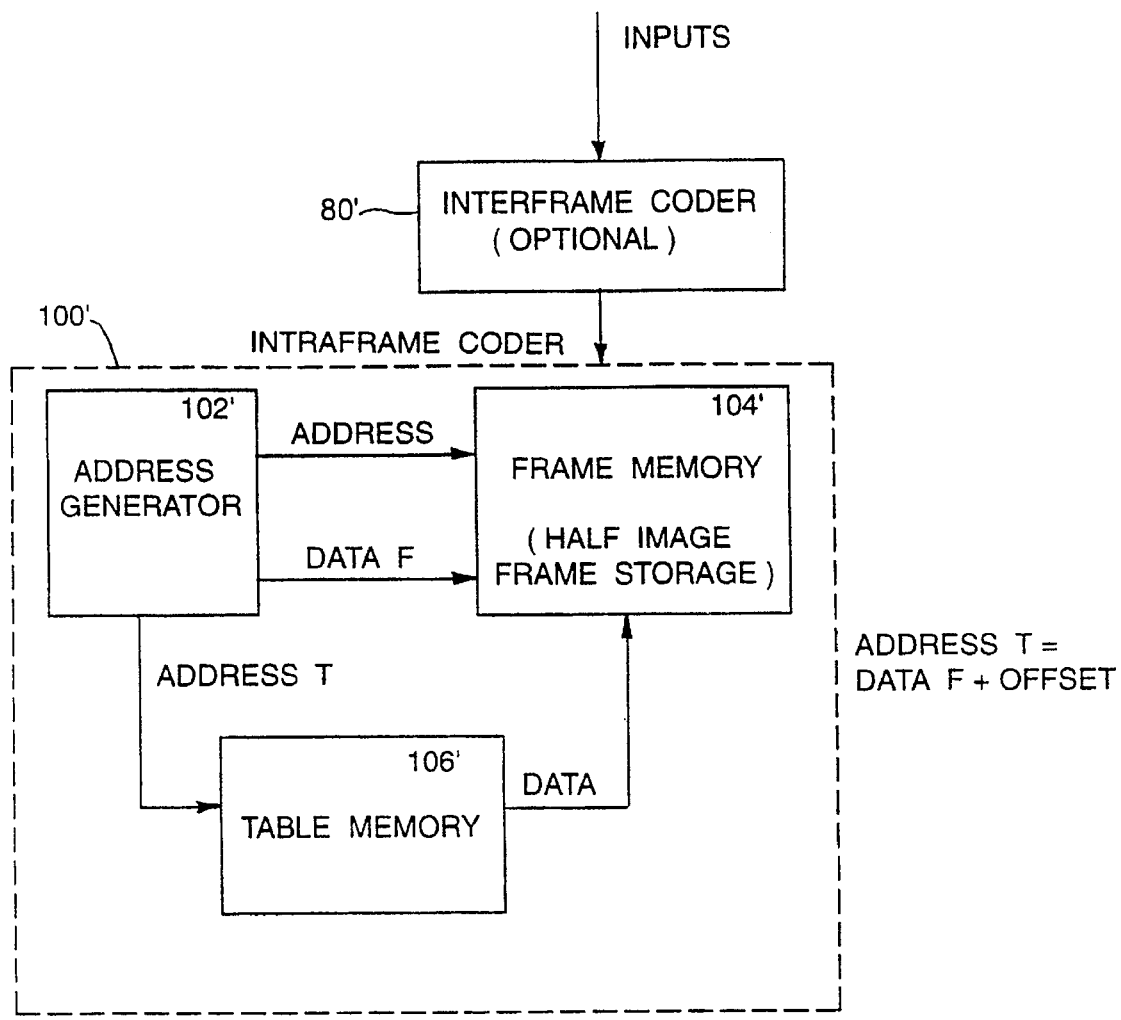
FIG. 11 is a schematic representation of another hardware implementation of the decoder of the method of FIG. 3.

FIG. 11 shows the architecture for the decoder similar to the encoder of FIG. 9. As illustrated, the interframe coder 80' is simply placed at the input to the chip 100', as opposed to the output.

The memory chips utilized to facilitate the look-up tables of the present invention are preferably read only memories (ROMs). However, it is recognized that other suitable memory means such as PROM, EPROM, EEPROM, RAM, etc. may be utilized.

The above description merely provides the disclosure of particular embodiments of the invention and is not intended for the purpose of limiting the same thereto. As such, the invention is not merely limited to only the above described embodiments. Rather, it is recognized that one skilled in the art could conceive alternative embodiments that fall within the spirit and scope of the invention.

Having thus described the invention, we claim:

1. A method for compressing and transmitting data, the method comprising the steps of:
   receiving the data;
   successively performing multiple stages of first lookup operations based on the data to obtain compressed data at each stage representing vector quantized discrete subband transform coefficients;
   transmitting the compressed data to a receiver;
   receiving the compressed data at the receiver;
   successively performing multiple stages of second lookup operations to selectively obtain at each stage before a last stage partially decompressed data representing a partial inverse subband transform of the compressed data.

2. The method of claim 1 wherein i lookup stages are performed and the compressed data is $2^i:1$ compressed data, where i is an integer.

3. The method according to claim 1 wherein the subband transform coefficients comprise discrete wavelet transform coefficients.

4. The method of claim 1 further comprising transcoding the compressed data after the transmitting at a gateway to the receiver to obtain further compressed data.

5. A method for compressing and transmitting data, the method comprising steps of:
   receiving the data;
   successively performing multiple stages of first lookup operations to obtain compressed data at each stage representing vector quantized discrete subband coefficients; and,
   transmitting the compressed data to a receiver.

6. The method according to claim 5 further comprising:
   receiving the compressed data at the receiver;
   successively performing multiple stages of second lookup operations to selectively obtain at each stage before a last stage decompressed data representing a partial inverse subband transform of the compressed data.

7. The method according to claim 5 further comprising transcoding the compressed data after the transmitting at a gateway to the receiver to obtain further compressed data.

8. The method according to claim 5 wherein the subband transform coefficients comprise discrete wavelet transform coefficients.

9. A method adaptable for use on signal data compressed by performing a subband transform followed by a vector quantization of the signal data, the method comprising steps of:
   receiving the compressed signal data;
   successively performing multiple stages of lookup operations to selectively obtain at each stage before a last stage partially decompressed data representing a partial subband transform of the compressed signal data.

10. An apparatus for compressing and transmitting data, the apparatus comprising:
    means for receiving the data;
    means for successively performing multiple stages of first lookup operations based on the data to obtain compressed data at each stage representing vector quantized discrete subband transform coefficients;
    means for transmitting the compressed data to a receiver;
    means for receiving the compressed data at the receiver;
    means for successively performing multiple stages of second lookup operations to selectively obtain at each stage before a last stage partially decompressed data representing a partial inverse subband transform of the compressed data.

11. The apparatus of claim 10 wherein i lookup stages are performed and the compressed data is $2^i:1$ compressed data, where i is an integer.

12. The apparatus according to claim 10 wherein the subband transform coefficients comprise discrete wavelet transform coefficients.

13. The apparatus according to claim 10 further comprising means for transcoding the compressed data at a gateway to the receiver to obtain further compressed data.

14. The apparatus for compressing and transmitting data, the apparatus comprising:
    means for receiving the data;
    means for successively performing multiple stages of first lookup operations to obtain compressed data at each stage representing vector quantized discrete subband coefficients; and,
    means transmitting the compressed data to a receiver.

15. The apparatus according to claim 14 further comprising:
    means for receiving the compressed data at the receiver; and,
    means for successively performing multiple stages of second lookup operations to selectively obtain at each stage before a last stage decompressed data representing a partial inverse subband transform of the compressed data.

16. The apparatus according to claim 14 further comprising means for transcoding the compressed data at a gateway to the receiver to obtain further compressed data.

17. The apparatus according to claim 14 wherein the subband transform coefficients comprise discrete wavelet transform coefficients.

18. An apparatus adaptable for use on signal data compressed by performing a subband transform followed by a vector quantization of the signal data, the apparatus comprising:
    means for receiving the compressed signal data;
    means for successively performing multiple stages of lookup operations to selectively obtain at each stage before a last stage partially decompressed data representing a partial subband transform of the compressed signal data.

* * * * *